(12) United States Patent
Friedman et al.

(10) Patent No.: US 9,973,335 B2
(45) Date of Patent: May 15, 2018

(54) SHARED BUFFERS FOR PROCESSING ELEMENTS ON A NETWORK DEVICE

(71) Applicant: INTEL CORPORATION, Santa Clara, CA (US)

(72) Inventors: Ben-Zion Friedman, Jerusalem (IL); Eliezer Tamir, Bait Shemesh (IL); Eliel Louzoun, Jerusalem (IL); Ohad Falik, Kfar Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 13/839,080

(22) Filed: Mar. 15, 2013

(65) Prior Publication Data

US 2013/0262868 A1 Oct. 3, 2013

Related U.S. Application Data

(63) Continuation of application No. PCT/US2012/031023, filed on Mar. 28, 2012.

(51) Int. Cl.
*H04L 9/06* (2006.01)
*G06F 21/72* (2013.01)
*H04L 29/06* (2006.01)

(52) U.S. Cl.
CPC ............ *H04L 9/0618* (2013.01); *G06F 21/72* (2013.01); *H04L 63/0485* (2013.01)

(58) Field of Classification Search
CPC ... H04L 9/0618; H04L 63/0485; H04L 69/16; H04L 69/161; H04L 69/32; H04L 69/325; H04L 2209/30; H04L 63/0272; H04L 69/04; H04L 9/061; G06F 21/72; G06F 12/00; G06F 13/14; G06F 21/80

USPC .......................................................... 713/171
See application file for complete search history.

(56) References Cited

U.S. PATENT DOCUMENTS

| 5,303,302 | A | 4/1994 | Burrows | |
|---|---|---|---|---|
| 7,613,917 | B1 * | 11/2009 | Chojnacki | G01C 21/32 713/150 |
| 8,037,319 | B1 * | 10/2011 | Clifford | G06F 21/6218 380/277 |

(Continued)

OTHER PUBLICATIONS

International Search Report and Written Opinion received for PCT Patent Application No. PCT/US2012/031023, dated Nov. 30, 2012, 11 pages.

(Continued)

*Primary Examiner* — Gary S Gracia

(57) ABSTRACT

Examples are disclosed for exchanging a key between an input/output device for network device and a first processing element operating on the network device. Data having a destination associated with the first processing element may be received by the input/output device. The exchanged key may be used to encrypt the received data. The encrypted data may then be sent to a buffer maintained at least in part in a memory for the network device. The memory may be arranged to enable sharing of the buffer with at least a second processing element operating on the network device. Examples are also disclosed for the processing element to receive an indication of the storing of the encrypted data in the buffer. The processing element may then obtain the encrypted data from the buffer and decrypt the data using the exchanged key.

18 Claims, 7 Drawing Sheets

(56) References Cited

U.S. PATENT DOCUMENTS

| | | | |
|---|---|---|---|
| 8,218,770 B2* | 7/2012 | Arulambalam | G06F 21/72 380/277 |
| 2003/0031320 A1* | 2/2003 | Fan | H04L 63/04 380/255 |
| 2004/0090988 A1* | 5/2004 | Masputra | H04L 69/16 370/469 |
| 2004/0168081 A1 | 8/2004 | Ladas et al. | |
| 2005/0108571 A1* | 5/2005 | Lu | G06F 21/34 726/4 |
| 2005/0254645 A1* | 11/2005 | Shippy | G06F 21/606 380/28 |
| 2006/0026580 A1* | 2/2006 | Cabillic | G06F 9/30174 717/151 |
| 2006/0072564 A1* | 4/2006 | Cornett | H04L 49/90 370/389 |
| 2006/0177061 A1* | 8/2006 | Orsini | G06F 21/606 380/268 |
| 2006/0195704 A1 | 8/2006 | Cochran et al. | |
| 2006/0227967 A1 | 10/2006 | Nishikawa | |
| 2007/0074208 A1* | 3/2007 | Ling | G06F 9/45558 718/1 |
| 2007/0079307 A1* | 4/2007 | Dhawan | H04L 29/12584 718/1 |
| 2007/0223472 A1* | 9/2007 | Tachibana | H04L 47/10 370/389 |
| 2007/0245140 A1* | 10/2007 | Sakaguchi | H04L 63/0428 713/160 |
| 2007/0253376 A1* | 11/2007 | Bonta | H04L 9/0822 370/338 |
| 2008/0028210 A1* | 1/2008 | Asano | H04L 63/0485 713/161 |
| 2008/0147915 A1* | 6/2008 | Kleymenov | G06F 9/5016 710/52 |
| 2008/0192930 A1 | 8/2008 | Balissat et al. | |
| 2008/0240434 A1* | 10/2008 | Kitamura | G06F 21/80 380/255 |
| 2009/0240793 A1* | 9/2009 | Zhang | H04L 49/90 709/223 |
| 2009/0287886 A1* | 11/2009 | Karstens | G06F 9/44557 711/147 |
| 2010/0153703 A1* | 6/2010 | Dodgson | G06F 21/805 713/153 |
| 2010/0161929 A1* | 6/2010 | Nation | G06F 9/5016 711/170 |
| 2010/0186087 A1* | 7/2010 | Bolton | H04N 21/2389 726/22 |
| 2010/0191959 A1* | 7/2010 | Czajkowski | G06F 21/14 713/155 |
| 2010/0202236 A1* | 8/2010 | Kahler | G06F 11/1441 365/228 |
| 2010/0229073 A1* | 9/2010 | Yu | H04L 1/0009 714/776 |
| 2010/0332849 A1* | 12/2010 | Takashima | H04L 9/0836 713/189 |
| 2011/0131328 A1* | 6/2011 | Horman | G06F 12/0284 709/226 |
| 2011/0179277 A1* | 7/2011 | Haddad | H04L 45/60 713/171 |
| 2011/0268119 A1* | 11/2011 | Pong | H04L 47/32 370/392 |
| 2012/0198229 A1* | 8/2012 | Takashima | H04L 9/0836 713/156 |
| 2012/0209971 A1* | 8/2012 | Howe | H04L 63/0428 709/223 |
| 2012/0255035 A1* | 10/2012 | Orsini | G06F 21/606 726/28 |
| 2012/0288088 A1* | 11/2012 | Chang | H04L 9/0618 380/28 |
| 2013/0159596 A1* | 6/2013 | Van De Ven | G06F 12/109 711/6 |
| 2013/0201998 A1* | 8/2013 | Cornett | H04L 49/90 370/429 |
| 2013/0326220 A1* | 12/2013 | Connelly | H04L 63/045 713/168 |

OTHER PUBLICATIONS

Office Action received for Korean Patent Application No. 2014-7027239, dated Sep. 21, 2015, 12 pages including 7 pages English translation.

* cited by examiner

SHARED BUFFERS FOR PROCESSING ELEMENTS ON A NETWORK DEVICE

BACKGROUND

An input/output (I/O) device such as a network interface card (NIC) may couple to a processing element on a host computing platform or network device such a server. The I/O device may use a receive queue (e.g., maintained in a cache for the processing element) to indicate to the processing element that data destined for the processing element has been received by the I/O device. The data destined for the processing element may have been placed by the I/O device in receive buffers maintained in a memory for the host network device. The memory for the host network device may be a type of memory such as dynamic random access memory (DRAM) or other types of volatile memory.

Typically, a number of receive buffers are allocated to a queue for a processing element to sustain a line rate throughput. For example, at a line rate of 10 gigabits/second (Gbs), and an average time to recycle a buffer of 0.1 seconds, 125 megabytes (MB) of memory for receive buffers may be allocated to the queue to sustain a line rate throughput for that queue. Also, in examples where the processing element may be implemented as a virtual machine (VM), technologies such as VM device queue (VMDq) or single-root L/O virtualization (SR-IOV) may result in several different queues for a single processing element.

The number of processing elements coupled to a given I/O device has also grown with the deployment of multi-core processors as well as the implementation of VMs on one or more cores of these multi-core processors. Some I/O devices may be designed to support hundreds of VMs and thousands of queues. Consequently, supporting thousands of queues would require hundreds of Gigabytes (GBs) of memory for receive buffers in order to sustain a line rate throughput for each queue.

DETAILED DESCRIPTION

As contemplated in the present disclosure, some I/O devices may be designed to support hundreds of VMs and thousands of queues. Supporting hundreds of VMs and thousands of queues may result in hundreds of GBs of physical memory for receive buffers to sustain a line rate throughput for each queue. Building host network devices having hundreds of GBs of types of memory such as DRAM add substantial costs. Also, power usage for hundreds of GBs of types of memory such as DRAM may make operating these types of network devices very expensive. In particular, where numerous network devices may be deployed in a rack server environment, the costs to build and/or operate a network device having hundreds of GBs of DRAM may be cost prohibitive. Therefore, current techniques to separately allocated receive buffers to each queue becomes more and more problematic as I/O devices can support higher and higher numbers of queues.

In some examples, techniques are implemented for encrypting or decrypting data stored in one or more shared buffers. For these examples, a key (e.g., a block cipher key) may be exchanged between an I/O device for a network device and a first processing element operating on the network device. Data (e.g., a data packet) may be received at the I/O device that has a destination associated with the first processing element. At least a first portion of the data (e.g., payload data) may be encrypted using the exchanged key. The encrypted first portion may then be sent to buffers maintained in a memory (e.g., DRAM) for the network device. According to some examples, the memory may be arranged to enable sharing of the buffers with at least a second processing element operating on the network device. An indication may then be made (e.g., by logic at the I/O device) to the processing element that the encrypted first portion has been sent to the buffers. Responsive to the indication, the first processing element may then obtain (e.g., copy) the encrypted first portion from the buffers and then decrypt the encrypted first portion using the exchanged key.

Figure 1:
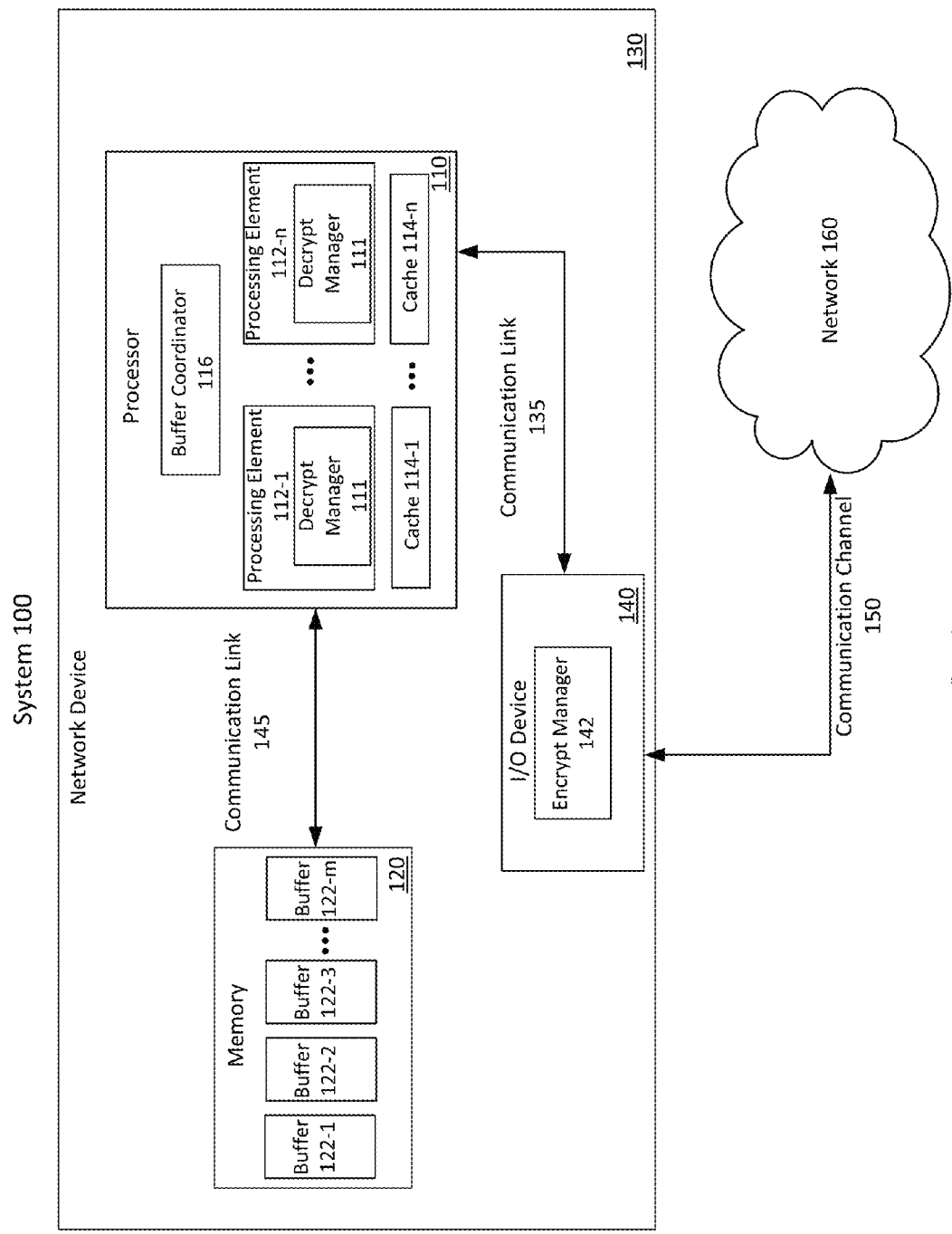
FIG. 1 illustrates an example system.

FIG. 1 illustrates an example system 100. In some examples, as shown in FIG. 1, system 100 may include a processor 110, a memory 120, an I/O device 140 and a network 160. Also, as shown in FIG. 1, processor 110 and I/O device 140 may be communicatively coupled via a communication link 135 and I/O device 140 may also be communicatively coupled to network(s) 160 via a communication channel 150. Also, processor 110 may couple to memory 120 via memory channel 145. As shown in FIG. 1, according to some examples, processor 110, memory 120 or I/O device 140 may be included on or resident on a network device 130.

In some examples, as shown in FIG. 1, processor 110 may include processing elements 112-1 to 112-n (where "n" represents any whole integer>1). Also, as shown in FIG. 1, memory 120 may include buffers 122-1 to 122-m (where "m" represents any whole integer>3). For these examples, processing elements 112-1 to 112-n may have a corresponding cache 114-1 to 114-n. According to some examples any number of queues may be included in a cache for a processing element. Also, as described more below, a buffer coordinator 116 may be arranged to operate in cooperation with processing elements 112-1 to 112-n, memory 120 and 100 device 140 to enable processing elements 112-1 to 112-n to share one or more buffers from among buffers 122-1 to 122-m. For example, each processing element may have at least read-only access to data stored in shared buffers from among buffers 122-1 to 122-m.

According to some examples, network device 130 may be part of a computing device deployed in a server environment. For these examples, I/O device 140 may be a network interface card (NIC) arranged to receive, forward or send data for network device 130. For example, I/O device 140 may receive or send data via communication channel 150 from network(s) 160. Data to be received or sent, for example, may be at least temporarily stored in buffers 122-1 to 122-m.

In some examples, as shown in FIG. 1, I/O device 140 may include an encrypt manager 142. For these examples, encrypt manager 142 may include logic and/or features configured or arranged to exchange separate keys such as separate block cipher keys with processing elements 112-1 to 112-*n*. I/O device 140 may subsequently receive data from network 160. The data, for example, may have a destination associated with processing element 112-1. Encrypt manager 142 may also be configured to encrypt at least a portion of the received data using a block cipher key that was exchanged with processing element 112-1. I/O device 140 and/or encrypt manager 142 may then forward the encrypt portion of received data to one or more buffers 122-1 to 122-*m* that may have been configured to be shared by buffer coordinator 116 as mentioned above.

According to some examples, as shown in FIG. 1, processing elements 112-1 to 112-*n* separately include a decrypt manager 111. For these examples, a given decrypt manager 111 for a processing element may include logic and/or features configured to obtain or copy the encrypted data sent to one or more buffers from among buffers 122-1 to 122-*m*. Decrypt manager 111 may then decrypt the encrypted data using a block cipher key that may have been exchanged with encrypt manager 142 at I/O device 140. In some examples, decrypt manager 111 may obtain the encrypted data responsive to an indication from I/O device 140 and/or encrypt manager 142 that encrypted data has been sent to the one or more buffers.

In some examples, processor 110 may be a multi-core processor and processing elements 112-1 to 112-*n* may be cores for the multi-core processor. In other examples, processing elements 112-2 to 112-*n* may include one or more virtual machines. For these other examples, the virtual machines may be implemented on a single processor included in processor 110. Alternatively, the virtual machines may be implemented on a core or cores of a multi-core processor included in processor 110. Also, for these other examples, buffer coordinator 116 may be implemented as part of a virtual machine manager (VMM) or hypervisor that facilitates control and/or management of these virtual machines.

According to some examples, as shown in FIG. 1, communication link 135 may communicatively couple or interconnect processor 110 and I/O device 140. For these examples, communication link 135 may be a data bus and may be operated in accordance with various communication protocols or standards. These communication protocols or standards may be described in one or more industry standards (including progenies and variants) to include, but not limited to, the Peripheral Component Interconnect Express (PCI Express) Base 3.0 specification, published in November of 2010 (hereinafter "the PCI Express specification").

In some examples, as shown in FIG. 1, memory channel 145 may couple memory 120 to processor 110. For these examples memory channel 145 may operate in compliance with one or more memory standards or specifications such as specifications by the JEDEC Solid State Technology Association. The specifications (including progenies and variants) by the JEDEC Solid State Technology Association may include, but are not limited to, the double data rate type-three (DDR3) synchronous dynamic random access memory (SDRAM) specification, published in June 2007 ("the DDR3 specification").

In some examples, communication channel 150 may include one or more communication links via which I/O device 140 may couple to network 160. These communication links may include various types of wired, wireless or optical communication mediums. For these examples, the communication links may be operated in accordance with one or more applicable communication or networking standards in any version.

Figure 2:
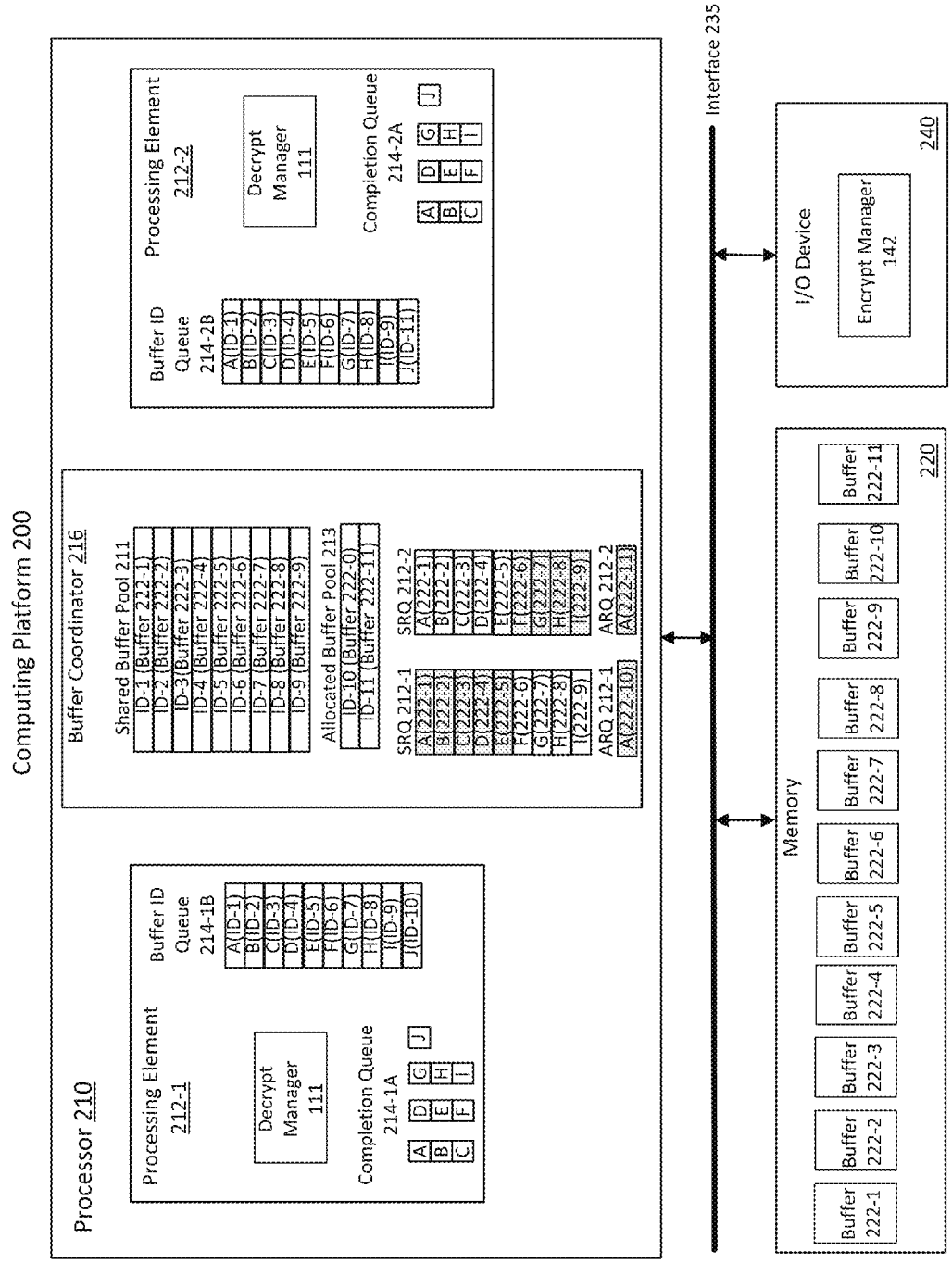
FIG. 2 illustrates a block diagram of an example network device.

FIG. 2 illustrates a block diagram of an example network device 200. As shown in FIG. 2, network device 200 includes a processor 210, memory 220 and I/O device 240. In some examples, as shown in FIG. 2, these elements of network device 200 may be communicatively coupled or interconnected via interface 235. Interface 235, for example, may operate in accordance with one or more communication protocols such as PCI-Express.

According to some examples, as shown in FIG. 2, processor 210 includes processing elements 212-1 and 212-2 as well as buffer coordinator 216. Memory 220 is shown in FIG. 2 as including buffers 222-1 to 222-11. Similar to L/O device 140 in FIG. 1, I/O device 240 in FIG. 2 is shown as also including an encrypt manager 142. Also, similar to the processing elements in FIG. 1, processing elements 212-1 and 212-2 are shown in FIG. 2 as separately including a decrypt manager 111.

In some examples, as shown in FIG. 2, processing elements 212-1 and 212-2 each include completion queues and buffer identification (ID) queues. For example, processing element 212-1 includes completion queue 214-1A and buffer ID queue 214-1B and processing element 212-2 includes completion queue 212-2A and buffer ID queue 214-2B. According to some examples these completion queues and buffer ID queues may be maintained in respective cache memories for processing elements 212-1 and 212-2. As described more below, a given processing element may utilize their respective completion queue and buffer ID queue to determine which buffer may include data that has a destination associated with the given processing element. Also, as described more below, I/O device 240 and/or encrypt manager 142 may utilize completion queues 214-1A or 214-1B to indicate to processing elements 212-1 or 212-2 that received data has been placed or stored in buffers maintained in or at memory 220.

According to some examples, as shown in FIG. 2, buffer coordinator 216 includes shared buffer index 211 and allocated buffer index 213. For these examples, buffer coordinator 216 may be configured to populate shared buffer index 211 with information associated with buffers that may be shared between processing elements 212-1 and 212-2. For example, shared buffer index 211, as shown in FIG. 2, includes information to indicate that buffers 222-1 to 222-9 may be arranged to be shared. Buffer coordinator 216 may also be arranged to populate allocated buffer index 213 with information associated with buffers that may be permanently allocated to a given processing element. For example, allocated buffer index 213, as shown in FIG. 2, includes information to indicate that buffers 222-10 and 222-11 may be separately and permanently allocated to processing elements 212-1 and 212-2, respectively. Buffer index 211 and allocated buffer index 213 may be maintained in a memory located at or with processor 210 (e.g., a shared cache memory—not shown).

Shared buffer index 211 or allocated buffer index 213 may be used by processor elements 212-1 or 212-2 to determine the physical addresses for buffers including received data. As mentioned more below, encrypted received data may be placed in the shared buffers listed in shared buffer index 211. Unencrypted received data may be placed in the permanently allocated buffers listed in allocated buffer index 213.

In some examples, as shown in FIG. 2, buffer coordinator 216 also includes shared receive queue (SRQ) 212-1, allocated receive queue (ARQ) 212-1, SRQ 212-2 and ARQ 212-2. SRQ/ARQ 212-1 and SRQ/ARQ 212-2 may be queues used by buffer coordinator 116 to indicate to I/O device 240 and/or encrypt manager 142 which buffers to place or store received data. For these examples, SRQ/ARQ 212-1 may be used to indicate buffer IDs and/or physical memory addresses to place data destined for processing element 212-1 and SRQ/ARQ 212-2 may be used to indicate buffer IDs and/or physical memory addresses to place data destined for processing element 212-2. SRQ/ARQ 212-1 and SRQ/ARQ 212-2 may also be maintained in a memory located at or with processor 210 (e.g., shared cache memory).

According to some examples, buffer coordinator 216 may determine which of the shared buffers listed in shared buffer index 211 or the permanently allocated buffers in allocated buffer index 213 are available to receive data destined for either processing element 212-1 or 212-2. For these examples, the shaded boxes indicate those buffers deemed by buffer coordinator 216 as being available to receive data. For example, as shown in FIG. 2, buffers A(222-1) to E(222-5) are shaded in SRQ 212-1 and buffers F(22-6) to I(222-9) are shaded in SRQ 212-2. Similarly, a shaded box for buffers included in ARQ 212-1 or ARQ 212-2 may indicate that buffers J(222-10) and J(222-11), respectively are also available to receive data.

In some examples, decrypt managers 11 at processing elements 212-1 and processing elements 212-2 may separately exchange respective first and second block cipher keys with encrypt manager 142 at I/O device 240. For these examples, the exchanged first block cipher key may be used by encrypt manager 142 to encrypt at least a portion of data destined for processing element 212-1. In order to decrypt the portion of encrypted data, decrypt manager 111 at processing element 212-1 may use the exchanged first block cipher key. Similarly, the exchanged second block cipher key may be used by encrypt manager 142 to encrypt at least a portion data destined for processing element 212-2 and decrypt manager 111 at processing element 212-2 may use the exchanged second block cipher key to decrypt this encrypted data.

According to some examples, data destined for processing element 212-1 may be received by I/O device 240. The data may be in the form of a data packet having a header and a payload. Encrypt manager 142 may include logic and/or features to encrypt the entire data packet using the first block cipher key. For these examples, encrypt manager 142 may cause I/O device 240 to forward the encrypted data packet to one or more buffers listed in SRQ 212-1 as being available to receive encrypted data. The encrypted data packet, for example may be sent to buffer 222-1 for at least temporary storage at a physical memory address at memory 220 associated with this buffer.

In some examples, encrypt manager 142 may include logic and/or features to indicate to processing element 212-1 that data destined for or having a destination associated with processing element 212-1 has been placed or stored at buffer 222-1. For example, encrypt manager 142 may place a pointer in completion queue 214-1A to indicate that a buffer having an identifier of "A" includes data having a destination associated with processing element 212-1. According to this example, decrypt manager 111 may include logic and/or features to compare the completion queue 214-1A having a pointer to identifier "A" to entries included in buffer ID queue 214-1B. The comparison, for example, may enable decrypt manager 111 to determine whether identifier "A" is mapped to either a shared or a permanently allocated buffer. If shared, decrypt manager 111 may assume that the data is encrypted. If allocated, decrypt manager 111 may assume the data is not encrypted. As shown in FIG. 2, "A" may map to ID-1 and ID-1 is included in shared buffer index 211 and maps to buffer 222-1. Since A(ID-1) maps to a buffer listed in shared buffer index 211, decrypt manager 111 may explicitly know the data stored at buffer 222-1 is encrypted (e.g., indicated in the completion status).

In some examples, only the payload for the received data packet may be encrypted using the first block cipher key and then sent to one or more of the shared buffers indicated in SRQ 212-1. For these examples, the header may be separated from the payload and sent to a buffer indicated in ARQ 212-1. As shown in FIG. 2, that buffer may be buffer 222-10. Since buffer 222-10 is permanently allocated to processing element 212-1 the other processing element 212-2 does not have access to this buffer and thus data stored in this buffer may not need to be encrypted. Once sent to buffer 222-10, encrypt manager 142 may place a pointer in completion queue 214-1A to indicate that a buffer having an identifier of "J" includes data destined for processing element 212-1. Decrypt manager 111 may then compare completion queue 214-1A having a pointer to identifier "J" to entries included in buffer ID queue 214-1B. The comparison, for example, may enable decrypt manager 1 to determine that identifier "J" is mapped to a permanently allocated buffer (ID-10 (Buffer 222-10)) in allocated buffer index 213. Since "J" maps to an allocated buffer, decrypt manager 111 may assume the data is not encrypted.

According to some examples, the header and the payload for the received data packet may be separately encrypted using the first block cipher key. For these examples, the payload may be a first portion of the received data packet and the header may be a second portion of the received data packet. Encrypt manager 142 may then forward the encrypted first portion to buffer 222-1 and the encrypted second portion to buffer 222-2. An indication may then be made to processing element 212- to indicate that data having a destination associated with processing element 212-1 has been stored at buffers 222-1 and 222-2. Decrypt manager 111 at processing element 212-1 may then determine which buffers include the encrypted data.

In some examples, multiple headers associated with multiple data packets having a destination associated with processing element 212-1 may be separated from their respective payloads. For these examples, the headers may be grouped and encrypted together using the first block cipher key and then sent to a single buffer as a group. Grouping of the headers for decryption may alleviate some of the workload of processing element 212-1 compared to separately decrypting headers stored in separate buffers.

According to some examples, decrypt manager 111 may include logic and/or features configured to obtain or copy the encrypted data that has been stored at buffer 222-1. For these examples, decrypt manager 111 may also include logic and/or features to decrypt the encrypted data using the first block cipher key that was exchanged with encrypt manager 142 as mentioned above.

In some examples, an application (not shown) working in cooperation with processing element 212-1 may be a destination for the data received by I/O device 240. For these examples, decrypt manager 111 may obtain the encrypted data stored at buffer 222-1 by performing a copy and decrypt operation that includes copying the encrypted data and decrypting the encrypted data before forwarding the decrypted data to a portion of memory for network device 200 (e.g., included in memory 220) that is accessible to the application. In alternative examples, the decrypted data may be sent to a secure enclave on network device 200. The secure enclave may include security elements to limit access to other elements (e.g., applications) such that the other elements may have read-only access to the decrypted data.

According to some examples, buffer coordinator 216 may indicate to or notify encrypt manager 142 that shared buffers previously used to store encrypted data (e.g., buffer 222-1) are now available to store subsequently or additionally received data having a destination associated with the processing element 212-1 or processing element 212-2. For these examples, the indication may be responsive to processing element 212-1 obtaining and/or decrypting the encrypted data stored in the buffer. Buffer coordinator 216 may indicate the buffer's availability by updating SRQ 212-1 for processing element 212-1 and/or by updating SRQ 212-2 for processing element 212-2.

In some examples, processing elements 212-1 and 212-2 may be implemented as virtual machines supported by processor 210. For these examples, the functionality of buffer coordinator 216 may be incorporated in a VMM or hypervisor that facilitates control and/or management of these virtual machines.

Figure 3:
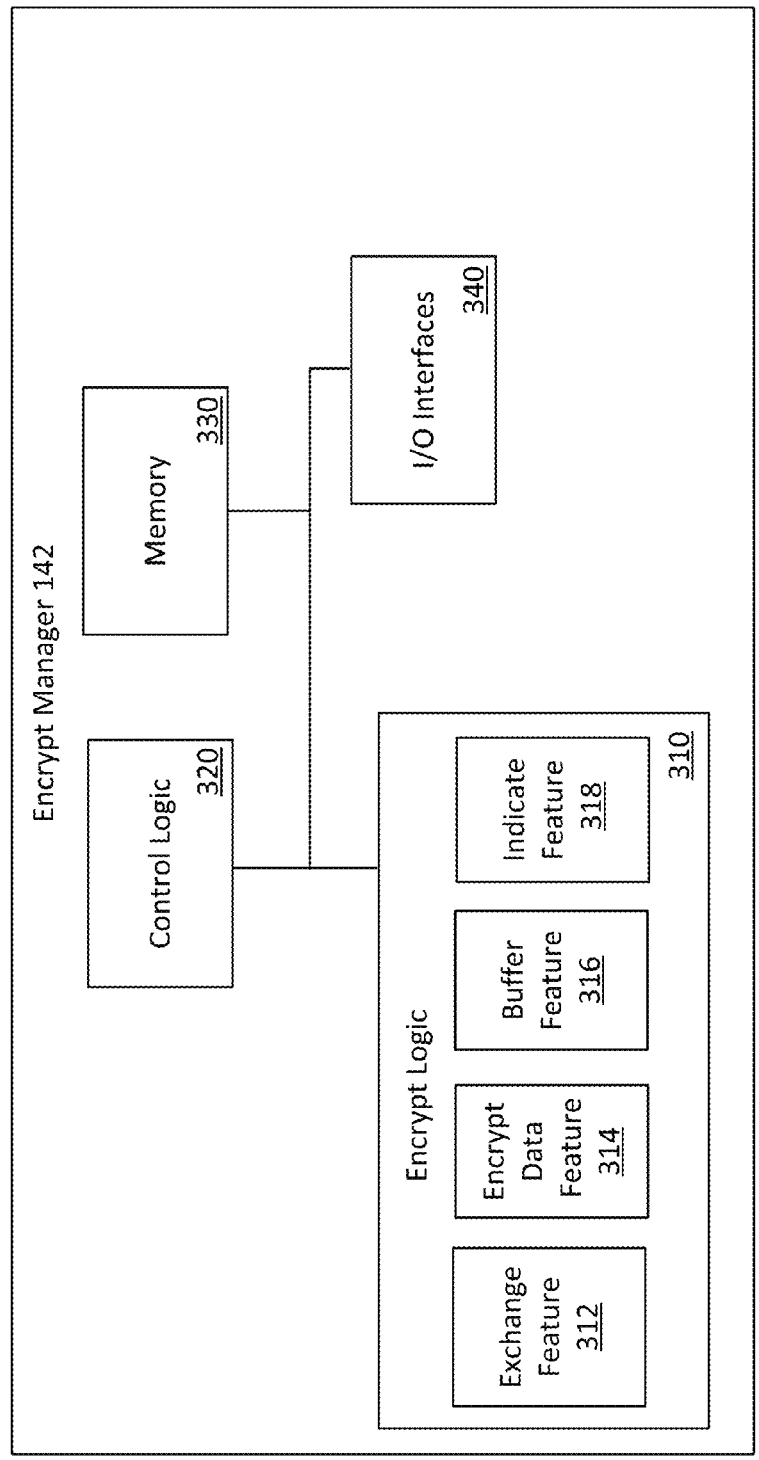
FIG. 3 illustrates a block diagram of an example architecture for an encrypt manager.

FIG. 3 illustrates a block diagram of an example architecture for encrypt manager 142. In some examples, encrypt manager 142 includes features and/or logic configured or arranged for encrypting at least a portion of data received at a I/O device for a network device and forwarding the encrypted data to a shared buffer. The shared buffer, for example, may be accessible to processing elements operating on the network device. According to some examples, as shown in FIG. 3, encrypt manager 142 includes a encrypt logic 310, a control logic 320, a memory 330 and input/output (I/O) interfaces 340. As illustrated in FIG. 3, encrypt logic 310 may be coupled to control logic 320, memory 330 and I/O interfaces 340. Encrypt logic 310 may include one or more of an exchange feature 312, an encrypt data feature 314, a buffer feature 316 or an indicate feature 318, or any reasonable combination thereof.

In some examples, the elements portrayed in FIG. 3 are configured to support or enable encrypt manager 142 as described in this disclosure. A given encrypt manager 142 may include some, all or more elements than those depicted in FIG. 3. For example, encrypt logic 310 and control logic 320 may separately or collectively represent a wide variety of logic device(s) or executable content to implement the features of encrypt manager 142. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor, a cryptography block, an offload processor or a combination thereof.

In some examples, as shown in FIG. 3, encrypt logic 310 includes exchange feature 312, encrypt data feature 314, buffer feature 316 or indicate feature 318. Encrypt logic 310 may be configured to use one or more of these features to perform operations. For example, exchange feature 312 may separately exchange a key such as block cipher key with processing elements operating on a network device. Encrypt data feature 314 may encrypt at least a portion of data. The data may have a destination associated with a given processing element and encrypt data feature 314 may encrypt at least a portion of the data with a key that was exchanged with the given processing element. Buffer feature 316 may cause the received data to be sent to either a shared or an allocated buffer. Indicate feature 318 may then indicate to the given processing element which buffer(s) include the received data.

In some examples, control logic 320 may be configured to control the overall operation of encrypt manager 142. As mentioned above, control logic 320 may represent any of a wide variety of logic device(s) or executable content. For some examples, control logic 320 may be configured to operate in conjunction with executable content or instructions to implement the control of encrypt manager 142. In some alternate examples, the features and functionality of control logic 320 may be implemented within encrypt logic 310.

According to some examples, memory 330 may be arranged to store executable content or instructions for use by control logic 320 and/or encrypt logic 310. The executable content or instructions may be used to implement or activate features, elements or logic of encrypt manager 142. As described more below, memory 330 may also be arranged to at least temporarily maintain information associated with exchanging a key with a processing element as mentioned above for FIGS. 1 and 2. Memory 330 may also be arranged to at least temporarily maintain information gathered to determine which buffer(s) to place encrypted data that was encrypted with the exchanged key and also which buffers to place unencrypted data (e.g., headers).

Memory 330 may include a wide variety of non-volatile memory media including, but not limited to one or more types of flash memory, programmable variables or states, read-only memory (ROM), random access memory (RAM), or other static or dynamic storage media.

In some examples, I/O interfaces 340 may provide an interface via a local communication medium or link between encrypt manager 142 and elements of I/O device 140 or elements of a network device. I/O interfaces 340 may include interfaces that operate according to various communication protocols or standards to communicate over the local communication medium or link. These communication protocols or standards may be described in one or more industry standards (including progenies and variants) such as those associated with the Inter-integrated Circuit ($I^2C$) specification, the System Management Bus (SMBus) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

Figure 4:
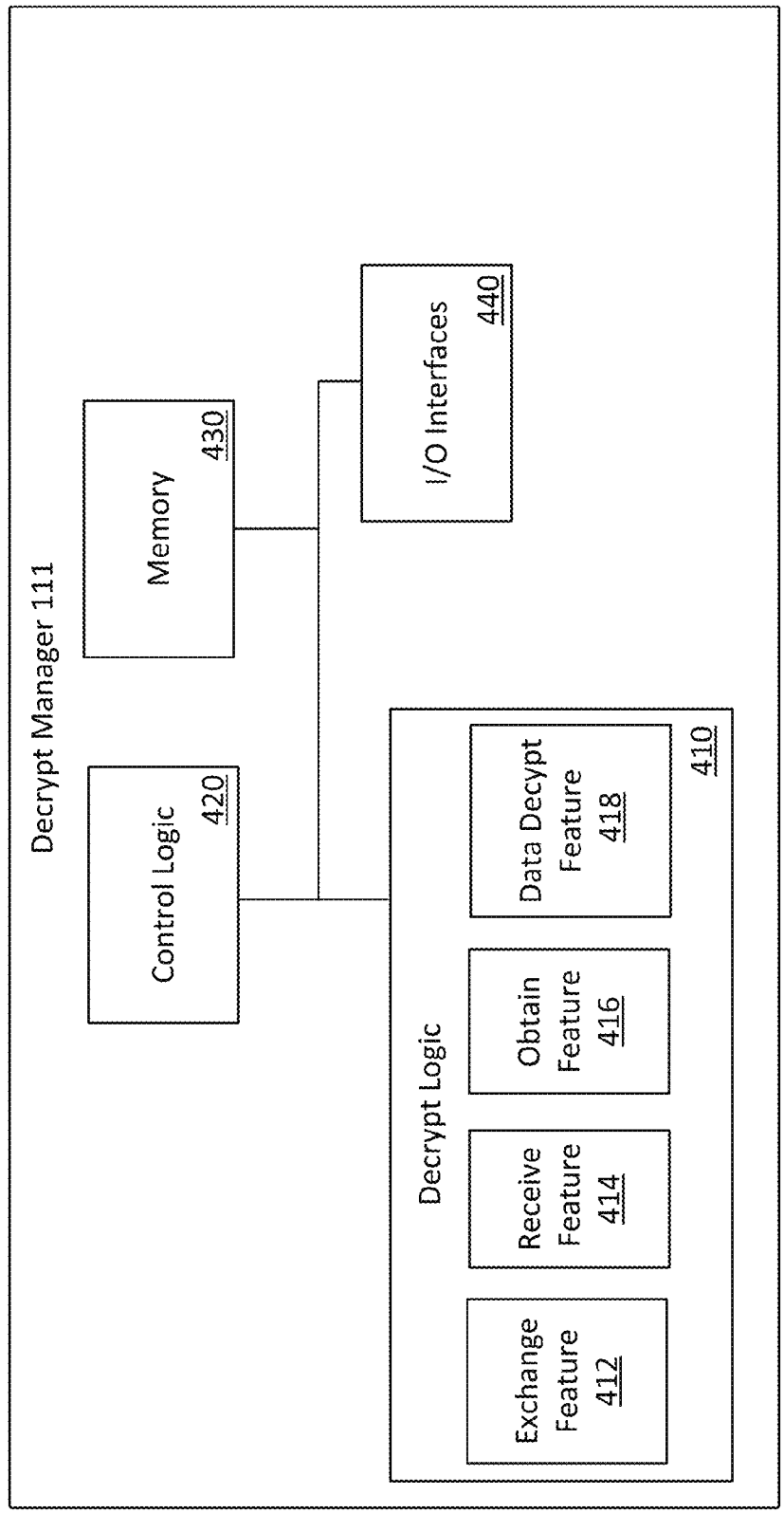
FIG. 4 illustrates a block diagram of an example architecture for a decrypt manager.

FIG. 4 illustrates a block diagram of an example architecture for decrypt manager 111. In some examples, decrypt manager 111 includes features and/or logic configured or arranged for obtaining data stored in a shared or allocated buffers maintained in a memory for a network device and decrypting encrypted portions of the data using an exchanged key. According to some examples, as shown in FIG. 4, decrypt manager 111 includes a decrypt logic 410, a control logic 420, a memory 430 and input/output (I/O) interfaces 440. As illustrated in FIG. 4, decrypt logic 410 may be coupled to control logic 420, memory 430 and I/O interfaces 440. Decrypt logic 410 may include one or more of an exchange feature 412, a receive feature 414, an obtain feature 416 or a data decrypt feature 418, or any reasonable combination thereof.

In some examples, the elements portrayed in FIG. 4 are configured to support or enable decrypt manager 111 as described in this disclosure. A given decrypt manager 111 may include some, all or more elements than those depicted in FIG. 4. For example, decrypt logic 410 and control logic 420 may separately or collectively represent a wide variety of logic device(s) or executable content to implement the features of decrypt manager 111. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor, a cryptography block, or a combination thereof.

In some examples, as shown in FIG. 4, decrypt logic 410 includes exchange feature 412, receive feature 414, obtain feature 416 or data decrypt feature 418. Decrypt logic 410 may be configured to use one or more of these features to perform operations while decrypt manager 111 is located at or with a processing element for a network device. For example, exchange feature 412 may exchange a key such as a block cipher key with an encrypt manager at an I/O device (e.g., encrypt manager 142) for the network device. Receive feature 414 may receive an indication from the encrypt manager or the I/O device when received data having a destination associated with the processing element has been stored in buffers maintained in a memory for the network device. Obtain feature 416 may obtain the received data and if the data has been encrypted, data decrypt feature 418 may decrypt the data using the exchanged key.

In some examples, control logic 420 may be configured to control the overall operation of decrypt manager 111. As mentioned above, control logic 420 may represent any of a wide variety of logic device(s) or executable content. For some examples, control logic 420 may be configured to operate in conjunction with executable content or instructions to implement the control of decrypt manager 111. In some alternate examples, the features and functionality of control logic 420 may be implemented within decrypt logic 410.

According to some examples, memory 430 may be arranged to store executable content or instructions for use by control logic 420 and/or decrypt logic 410. The executable content or instructions may be used to implement or activate features, elements or logic of decrypt manager 111. As described more below, memory 430 may also be arranged to at least temporarily maintain information associated with exchanging a key with an I/O device and/or an encrypt manager as mentioned above for FIGS. 1 and 2. Memory 430 may also be arranged to at least temporarily maintain information gathered to determine which buffer(s) to obtain encrypted data that was encrypted with the exchanged key and also which buffers to obtain unencrypted data (e.g., headers).

Memory 430 may include a wide variety of non-volatile memory media including, but not limited to, one or more types of flash memory, programmable variables or states, ROM, RAM, or other static or dynamic storage media.

In some examples, I/O interfaces 440 may provide an interface via a local communication medium or link between decrypt manager 111 and elements located at or with processing elements, processors or other devices of a network device. I/O interfaces 440 may include interfaces that operate according to various communication protocols or standards to communicate over the local communication medium or link. These communication protocols or standards may be described in one or more industry standards (including progenies and variants) such as those associated with the Inter-Integrated Circuit (I²C) specification, the System Management Bus (SMBus) specification, the Peripheral Component Interconnect Express (PCI Express) specification, the HyperTransport (HT) specification, or Intel® QuickPath Interconnect (QPI) specification. Although this disclosure is not limited to only the above-mentioned standards and associated protocols.

Figure 5:
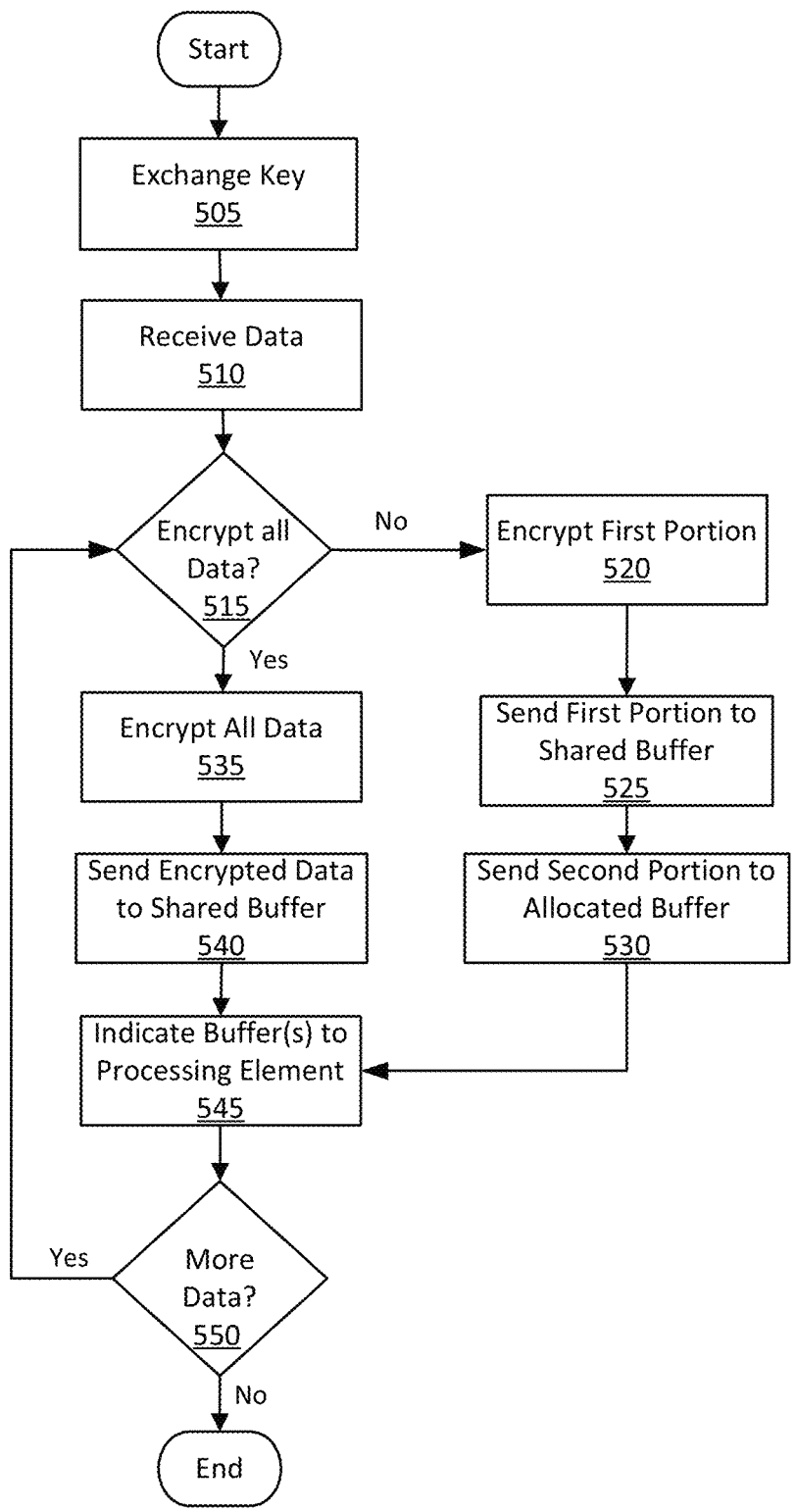
FIG. 5 illustrates an example flow diagram for encrypting at least a portion of data to be stored in a shared buffer.

FIG. 5 illustrates an example flow diagram for encrypting at least a portion of data to be stored in a shared buffer. In some examples, elements of system 100 as shown in FIG. 1 or network device 200 as shown in FIG. 2 may be used to illustrate example operations related to the flow chart depicted in FIG. 5. Encrypt manager 142 as shown in FIGS. 1-3 may also be used to illustrate the example operations. But the described example operations are not limited to implementations on system 100 or network device 200 or to encrypt manager 142 as described above for FIGS. 1-3.

Moving from the start to block 505 (Exchange Key), encrypt manager 142 may include logic and/or features configured to separately exchange a key (e.g., via exchange feature 312) with processing elements operating on a network device such as network device 200. In some examples, the separately exchanged key may include a block cipher key. The block cipher key may be based on cryptographic standards (including progenies and variants) such as the Triple Data Encryption Standard (3DES or Triple DES), National Institute of Standards and Technology Special Publication 800-67, published in 2004, or the Advanced Encryption Standard (AES), Federal Information Processing Standards Publication 197, published in 2001, although this disclosure is not limited to only a block cipher key based on these standards and/or publications. Other types of cipher keys such a stream cipher keys are also contemplated by this disclosure.

Proceeding from block 505 to block 510 (Receive Data), data having a destination associated with a given processing element such as processing element 212-1 may be received by an I/O device for a network device such as I/O device 240. In some examples, the received data may be in the form of a data packet having a header and a payload.

Proceeding from block 510 to decision block 515 (Encrypt All Data?), encrypt manager 142 may include logic and/or features configured to determine whether to encrypt the entire received data packet or portions of the data packet (e.g. via data encrypt feature 314). The payload portion may be a first portion of the received data packet and the header may be a second portion. In some examples, only the first portion may be encrypted. For these examples where only the first portion is encrypted, the process moves to block 520. In other examples, both the header and the payload are both to be encrypted. For these other examples were both portions are encrypted, the process moves to block 535.

Moving from decision block 515 to block 520 (Encrypt First Portion), encrypt manager 142 may include logic and/or features configured to encrypt a first portion of the received data packet (e.g., via data encrypt feature 314). In some examples, encrypt manager 142 may encrypt the first portion with a block cipher key exchanged with processing element 212-1.

Proceeding from block 520 to block 525 (Forward First Portion to Shared Buffer(s)), encrypt manager 142 may include logic and/or features configured to at least cause the encrypted first portion to be sent to one or more shared buffers maintained at memory 220 (e.g., via buffer feature 316). In some examples, encrypt manager 142 may utilize SRQ 121-1 maintained by buffer coordinator 216 to identify which buffer(s) to send the encrypted first portion. For example, encrypt manager 142 may identify buffer 222-1 as the shared buffer that will at least temporarily store the encrypted first portion once sent.

Proceeding from block 525 to block 530 (Forward Second Portion to Permanently Allocated Buffer), encrypt manager 142 may include logic and/or features configured to at least cause the second portion to be forward to a buffer permanently allocated to processing element 212-1 (e.g. via buffer feature 316). The permanently allocated buffer, for example, may be maintained at memory 220. In some examples, encrypt manager 142 may utilize ARQ 121-1 maintained by buffer coordinator 216 to identify which buffer(s) to send the second portion. For example, encrypt manager 142 may identify buffer 222-10 as the permanently allocated buffer that will at least temporarily store the second portion once sent.

Moving from decision block 515 to block 535 (Encrypt All Data), encrypt manager 142 may include logic and/or features configured to encrypt the entire received data packet (e.g., via data encrypt feature 314). In some examples, encrypt manager 142 may encrypt the entire data packet with the block cipher key exchanged with processing element 212-1

Proceeding from block 535 to block 540 (Forward Encrypted Data to Shared Buffers), manager 142 may cause the encrypted data packet to be sent to one or more shared buffers maintained at memory. Similar to the examples mentioned above for block 525, encrypt manager 142 may utilize SRQ 121-1 to identify which buffer(s) to send the encrypted data packet.

Proceeding from either blocks 530 or block 540 to block 545 (Indicate Buffer(s) to Processing Element), encrypt manager 142 may include logic and/or features configured to indicate which buffer(s) include data for processing element 212-1 (e.g., via indicate feature 318). In some examples, encrypt manager 142 may utilize completion queue 214-1A at processing element 212-1 to indicate which buffers have either encrypted data (e.g. stored in shared buffer(s)) or unencrypted data (e.g., stored in permanently allocated buffers).

Proceeding from block 545 to decision block 550, (More Data?), encrypt manager 142 may include logic and/or features to determine (e.g., via data encrypt feature 214) whether more data having a destination associated with processing element 212-1 (e.g., additional data packets) needs to be encrypted. If more data needs to be encrypted, the process moves to decision block 515. Otherwise, the process comes to an end.

Figure 6:
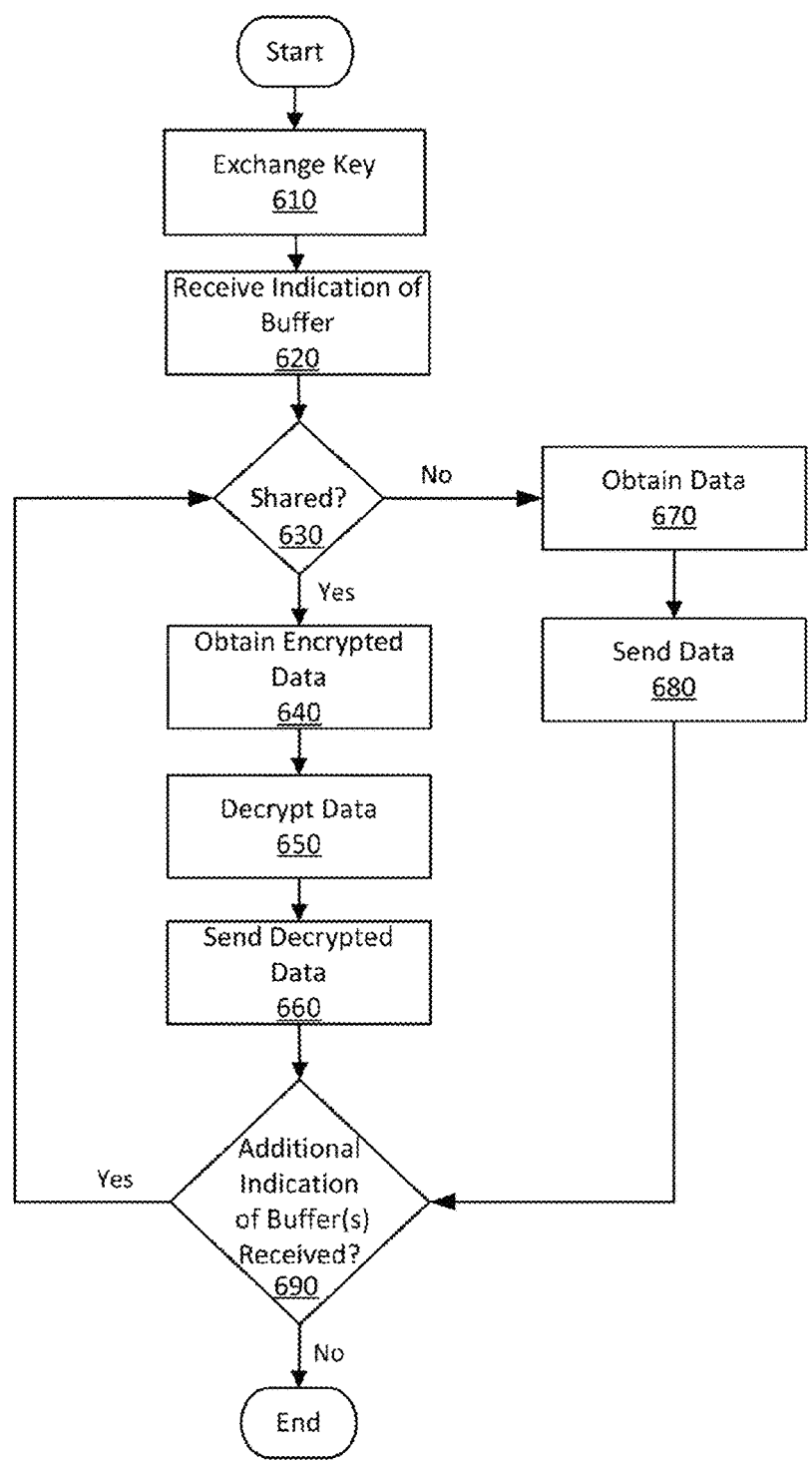
FIG. 6 illustrates an example flow diagram for decrypting at least a portion of data stored in a shared buffer.

FIG. 6 illustrates an example flow diagram for decrypting at least a portion of data stored in a shared buffer. In some examples, elements of system 100 as shown in FIG. 1 or network device 200 as shown in FIG. 2 may be used to illustrate example operations related to the flow chart depicted in FIG. 6. Decrypt manager 111 as shown in FIG. 1, 2 or 4 may also be used to illustrate the example operations. But the described example operations are not limited to implementations on system 100 or network device 200 or to decrypt manager 111 as described above for FIG. 1, 2 or 4.

Moving from the start to block 610 (Exchange Key), a decrypt manager 111 at a processing element (e.g., processing element 212-1) may include logic and/or features configured to exchange a key (e.g., via key feature 412) with elements or features of encrypt manager 142 at I/O device 240. In some examples, the key may be a block cipher key based either on 3DES or AES.

Proceeding from block 610 to block 620 (Receive Indication of Buffer(s)), decrypt manager 111 may include logic and/or features configured to receive an indication that received data has been placed or stored at buffers maintained in or at memory 220 (e.g., via receive feature 414). In some examples, encrypt manager 142 may have placed a pointer in completion queue 214-1A to indicate which buffer(s) include or includes the received data.

Proceeding from block 620 to decision block 630 (Shared?), decrypt manager 111 may include logic and/or features configured to determine whether the received data has been stored in shared or permanently allocated buffers (e.g., via obtain feature 416). In some examples, decrypt manager 111 may compare the pointer placed in completion queue 212-1A to buffer ID queue 214-1B to determine whether the pointer points to a buffer identifier that is mapped to either a shared or a permanently allocated buffer. According to one example, a pointer to "A" in completion queue 214-1A maps to ID-1 in buffer ID queue 214-1B. Decrypt manager 111 may then determine that ID-1 maps to Buffer 222-1 in shared buffer index 211 maintained by buffer coordinator 216. For this example, the process moves to block 640. According to another example, a pointer to "J" in completion queue 214-1A maps to ID-10 in buffer ID queue 214-1B. Decrypt manager 111 may then determine that ID-10 maps to Buffer 222-10 in allocated buffer index 213. For this other example, the process moves to block 670.

Proceeding from decision block 630 to block 640 (Obtain Encrypted Data), decrypt manager 111 may include logic and/or features configured to obtain the encrypted data stored at shared buffer 222-1 (e.g., via obtain feature 416). In some examples, the encrypted data may be obtained via copying the encrypted data stored in buffer 222-1.

Proceeding from block 640 to block 650 (Decrypt Data), decrypt manager 111 may include logic and/or features configured to decrypt the encrypted data stored in buffer 222-1. In some examples, the encrypted data may be decrypted using the block cipher key exchanged with encrypt manager 142 as mentioned above.

Proceeding from block 650 to block 660 (Forward Decrypted Data), decrypt manager 111 may include logic and/or features configured to forward the decrypted data to a final destination for the data that was received by I/O device 240. In some examples, the final destination may be an application working in cooperation with processing element 212-1. For these examples, decrypt manager 111 may forward the decrypted data to a portion of memory for network device 200 (e.g., memory 220) that is accessible to the application.

Moving from decision block 630 to block 670 (Obtain Data), decrypt manager 111 obtains the data (e.g., via obtain feature 416). In some examples, since the data was stored in permanently allocated buffer 222-10 the data was not encrypted. For these examples, the data may be obtained by decrypt manager 111 via copying the data stored in buffer 222-10.

Moving from block 670 to block 680 (Forward Data), decrypt manager 111 may forward the data to the final destination. In some examples, the final destination may be an application working in cooperation with processing element 212-1. For these examples, decrypt manager 111 may forward the data to a portion of memory for network device 200 that is accessible to the application Proceeding from block 660 or block 680 to decision block 690 (Additional Indication of Buffer(s) Received?), decrypt manager 111 may include logic and/or features to determine whether additional indication of buffer(s) storing data has been received (e.g., via receive feature 414). If other indications have been received, the process moves to decision block 630. Otherwise, the process comes to an end.

Figure 7:
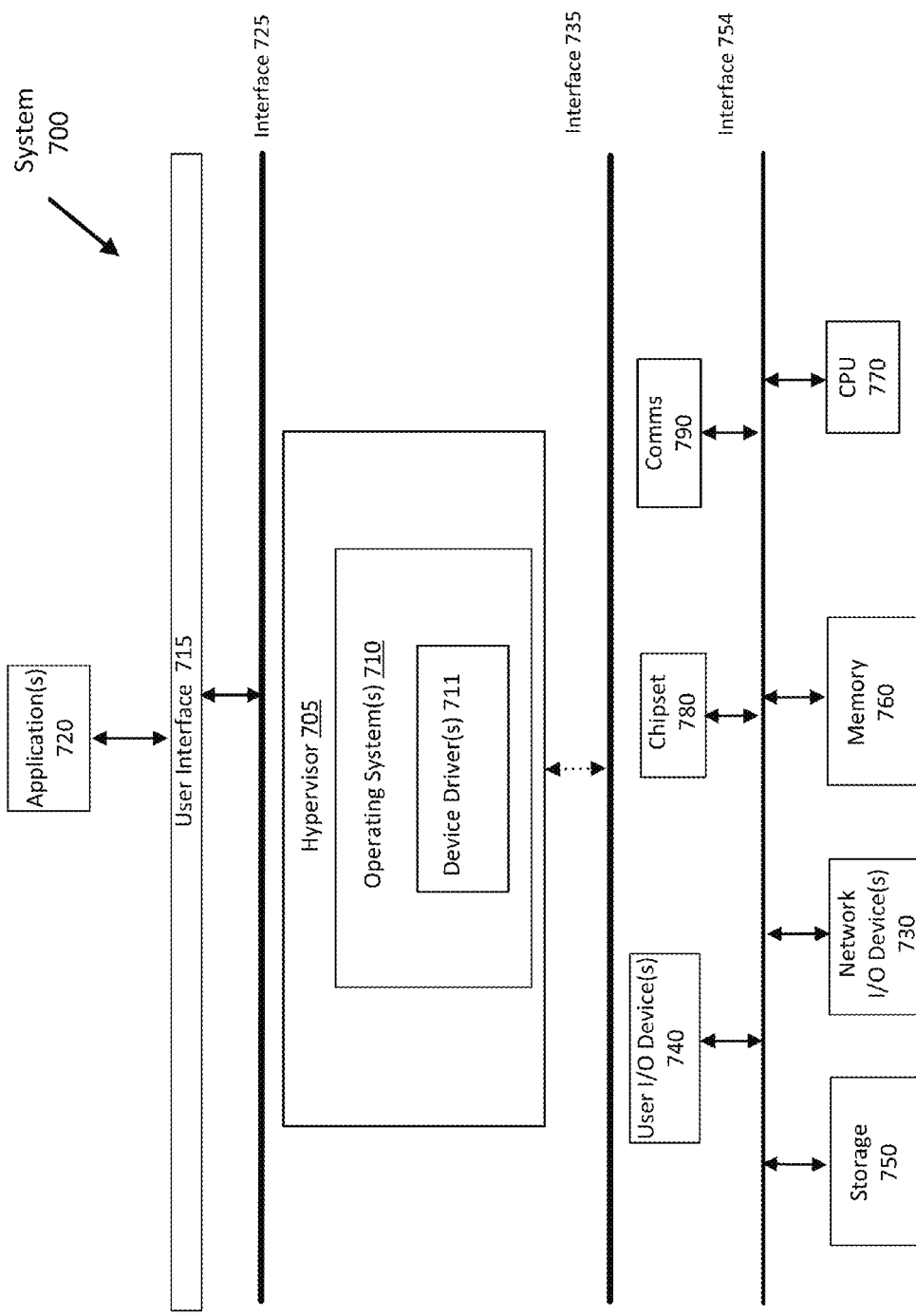
FIG. 7 illustrates an example system diagram for a network device.

FIG. 7 illustrates an example system 700. As shown in FIG. 7, system 700 includes hypervisor 705, operating system(s) 710, application(s) 720, network input/output (I/O) device(s) 730, user input/output (I/O) device(s) 740, a storage 750, a memory 760, a central processing unit (CPU) 770, a chipset 780, and communications (Comms) 790. According to some examples, several interfaces are also depicted in FIG. 7 for interconnecting and/or communicatively coupling elements of system 700. For example, user interface 715 and interface 735 may allow for users (not shown) and/or application(s) 720 to couple to operating system(s) 710 and/or hypervisor 705. Also, interface 735 may allow for elements of hypervisor 705 and/or operating system(s) 710 (e.g., device driver(s) 711) to communicatively couple to elements of system 700 such as network I/O device(s) 730, user I/O device(s) 740, storage 750, memory 760. CPU 770, chipset 780 or comms 790. Interface 754, for example, may allow hardware and/or firmware elements of system 700 to communicatively couple together, e.g., via a system bus or other type of internal communication channel.

In some examples, as shown in FIG. 7, system 100 may include operating system(s) 710. Operating system(s) 710, for example, may include one or more operating systems. Separate operating systems included in operating systems(s) 710 may be implemented as part of separate virtual machines supported by elements of system 700. For these examples, the separate virtual machines may be associated with one or more processors included in CPU 770. Also, for these examples, hypervisor 705 may serve as a virtual machine manager for these separate virtual machines.

According to some examples, as shown in FIG. 7, operating system(s) 710 may separately include device driver(s) 711. Device driver(s) 711 may include logic and/or features configured to interact with hardware/firmware type elements of system 700 (e.g., via interface 735). For example, device driver(s) 711 may include device drivers to control or direct storage 750 or memory 760 to fulfill requests made by application(s) 720 or operating system(s) 710. Device driver(s) 711 may also include device drivers to allow network I/O device(s) 730 to interact with CPU 770 and memory 760 to receive/forward data via communication channels coupled to system 700 (e.g., via network I/O device(s) 730 or comm 790).

In some examples, application(s) 720 may include applications that may be implemented on system 700. For these examples, applications(s) 720 may request access (e.g., through operating system(s) 710) or use of elements of system such as user I/O devices 740, storage 750 or memory 760.

According to some examples, network I/O device(s) 730 may be similar to I/O device 140 described above for FIG. 1. For these examples, network I/O device(s) 730 may include an encrypt manager 142 (not shown in FIG. 7) having logic and/or features configured or arranged for encrypting at least a portion of data received by network I/O device(s) 730 and forwarding the encrypted data to a shared buffer (e.g., maintained at memory 760). In some examples, network I/O device(s) 730 may be arranged to function as a network interface card (NIC).

In some examples, user I/O device(s) 740 may include one or more user input devices coupled to interface 754 for entering data and commands to be implemented by elements of system 700. For example, the user input devices may include a keyboard, mouse, touch screen, track pad, track ball, isopoint, a voice recognition system, and/or the like. Similarly, user I/O device(s) 740 may include one or more user output devices coupled to interface 754 for outputting information to an operator or user. For example, the user output devices may include one or more displays, printers, speakers, and/or other output devices, if desired. For example, one of the user output devices may be a display. The display may be a cathode ray tube (CRTs), liquid crystal displays (LCDs), or any other type of display.

In some examples, storage 750 may include various types of memory arranged to be implemented or operated in a storage mode of operation. Storage 750 may include at least one or a combination of different types of storage devices to store relatively large amounts of data. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change material (PCM)). Although not shown in FIG. 7, in some examples, storage 750 may be a user I/O device included among I/O devices 140.

According to some examples, memory 760 may include at least one or a combination of different types of memory to include RAM, DRAM, static RAM (SRAM), phase change material RAM (PRAM), and/or other types of volatile memory. In some examples, memory 760 may be arranged to maintain buffers (shared or allocated) used by network I/O device(s) 730, elements of CPU 770 and/or operating system(s) 110 to at least temporarily store received data. For these examples, memory 760 may function similarly to memory 120 or memory 220 as described above for system 100 or network device 200.

According to some examples, CPU 770 may be implemented as a central processing unit for system 700. CPU 770 may include one or more processors separately having one or more processor cores. In some examples, CPU 770 may include one or more processors similar to processor 110 described for system 100 or processor 210 described for network device 200. Also, the processors included in CPU 770 may be any type of processor, such as, for example, a multi-core processor, a reduced instruction set computer (RISC), a processor having a pipeline, a complex instruction set computer (CISC), digital signal processor (DSP), and so forth.

In some examples, chipset 780 may provide intercommunication among operating system(s) 710, network user device(s) 730, user I/O device(s) 740, storage 750, memory 760, CPU 770 or comms 790. For example, chipset 780 may provide intercommunication between operating system(s) 710, user I/O device(s) 740, storage 750 and CPU 770 to retrieve information from storage 750 to display graphics on a display included in user I/O device(s) 740. The graphics may have been rendered by CPU 770 at the request of an operating system included in operating system(s) 710.

In some examples, comms 790 may include logic and/or features to enable system 700 to communicate externally with elements remote to system 700. These logic and/or features may include communicating over wired, wireless or optical communication channels or connections via one or more wired, wireless or optical networks. In communicating across such networks, comms 790 may operate in accordance with one or more applicable communication or networking standards in any version. Also, in some examples, comms 790 may be integrated with network I/O device(s) 730 in order to receive/forward data associated with communications to elements remote to system 700.

As mentioned above, interface 754, may allow hardware and/or firmware elements of system 700 to communicatively couple together. According to some examples, interface 754 may operate in accordance with one or more protocols or standards. These protocols or standards may be described in one or one or more industry standards (including progenies and variants) such as those associated with the Inter-integrated Circuit (I$^2$C) specification, the System Management Bus (SMBus) specification, the Accelerated Graphics Port (AGP) specification, the Peripheral Component Interconnect Express (PCI Express) specification, the Universal Serial Bus (USB), specification, the High-Definition Multimedia Interface (HDMI) standard, the Digital Visual Interface (DVI) specification, the Bluetooth™ specification, or the Serial Advanced Technology Attachment (SATA) specification. Although this disclosure is not limited to only the above-mentioned standards and associated protocols.

In some examples, system 700 may be included in a computing device. Examples of a computing device may include, but is not limited to, a server, a blade server, a computing board, a desktop computer, a personal computer (PC) or a laptop computer, an ultra-mobile computer, a tablet, a touch pad, a portable computer, a handheld computer, a palmtop computer, a personal digital assistant (PDA), a cellular telephone, combination cellular telephone/PDA, a television, a smart device (e.g., smart phone, smart tablet or smart television), a mobile internet device (MID), a messaging device, a data communication device, and so forth.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g. transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces. API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

In some examples, a first method may be implemented that includes exchanging a first key between an input/out device for a network device and a first processing element operating on the network device. Data may then be received at the input/output device that has a destination associated with the first processing element. At least a first portion of the received data may be encrypted using the first key and the encrypted first portion may be sent to one or more buffers maintained at least in part in memory for the network device. The memory may be arranged to enable sharing of the one or more buffers with at least a second processing element operating on the network device.

According to some examples, implementation of this first method may include the first key including one of a block cipher key or a stream cipher key. For these examples, the block cipher key or the stream cipher key may be based on one of Triple Data Encryption Standard (3DES) or Advanced Encryption Standard (AES).

In some examples, implementation of this first method may include indicating to the first processing element that the encrypted first portion has been sent to the one or more buffers. The first processing element may be arranged to obtain the encrypted first portion from the one or more buffers responsive to the indication. Also, the first processing element may be arranged to decrypt the encrypted first portion using the first key.

According to some examples, implementation of this first method may include the destination associated with the first processing element including the destination also being associated with an application arranged to operate in cooperation with the first processing element. For these examples, the first processing element may obtain the encrypted first portion by performing a copy and decrypt operation that includes copying the encrypted first portion of data and decrypting the encrypted first portion before sending the decrypted first portion to a portion of the memory for the network device that is accessible to the application.

In some examples, implementation of this first method may include receiving the data at the input/output device as a data packet having a header and a payload. For these examples, the first portion of the received data may include one of the payload or the header. If the first portion of the received data includes the payload, sending the encrypted first portion to the one or more buffers may include sending the encrypted payload to a first buffer from among the one or more buffers. Also, a second portion of the received data may include the header. The header may be separately encrypted using the first key. The encrypted header may then be sent to a second buffer from among the one or more buffers. An indication to the first processing element may be made that the encrypted payload has been sent to the first buffer and the encrypted header has been sent to the second buffer. Responsive to the indication, the first processing element may be arranged to obtain the encrypted payload from the first buffer and obtain the encrypted header from the second buffer. Also, the first processing element may be arranged to decrypt the encrypted payload and the encrypted header using the first key.

According to some examples, implementation of this first method may include the first portion of the received data including the payload. Sending the encrypted first portion may include sending the encrypted payload to a first buffer from among the one or more buffers. A second portion of the received data may include the header and the header may be sent to a second buffer from among the one or more buffers. For these examples, an indication may be made to the first processing element that the encrypted payload has been sent to the first buffer and the header has been sent to the second buffer, responsive to the indication, the first processing element arranged to obtain the encrypted payload from the first buffer and obtain the header from the second buffer, the first processing element also arranged to decrypt the encrypted payload using the first key.

In some examples, implementation of this first method may include the first portion of the received data including the payload, a second portion of the received data including the header, sending the header to a buffer maintained in the memory for the network device, the buffer permanently allocated to the first processing element. For these examples, an indication may be made to the first processing element that the encrypted payload has been sent to the first buffer and the header has been sent to the permanently allocated buffer, responsive to the indication, the first processing element may be arranged to obtain the encrypted payload from the first buffer and obtain the header from the permanently allocated buffer. The first processing element may also be arranged to decrypt the encrypted payload using the first key.

According to some examples, implementation of this first method may include the first processing element and the second processing element as one of separate cores of a multi-core processor or separate virtual machines implemented on one or more cores of the multi-core processor. For these examples, the first processing element and the second processing element may be respective first and second virtual machines. The network device may include a virtual machine manager to establish a pool of buffers that includes the one or more buffers. The first and second virtual machines may have read-only access to the pool of buffers. An indication may be made to the first virtual machine that the encrypted first portion of data has been sent to the one or more buffers. The first virtual machine may be arranged to obtain the encrypted first portion from the one or more buffers responsive to the indication. The first virtual machine may also be arranged to decrypt the encrypted first portion using the first key. The virtual machine manager, responsive to the first virtual machine decrypting the first portion of data, may indicate to the input/out device that the one or more buffers are available to at least temporarily store additionally received data having a destination associated with the first virtual machine or the second virtual machine.

According to some examples, at least one machine readable medium comprising a plurality of instructions that in response to being executed on a computing device cause the computing device to carry out the example first method as mentioned above.

In some examples an apparatus or device may include means for performing the example first method as mentioned above.

In some examples, a second method may be implemented that includes exchanging a first key between an input/out device for a network device and a first processing element operating on the network device. An indication may also be received that at least a first portion of data received by the input/output device and having a destination associated with the first processing element has been encrypted using the first key. The indication may also to include information to indicate that the encrypted first portion is stored in one or more buffers maintained at least in part in memory for the network device. The memory may be arranged to enable sharing of the one or more buffers with at least a second processing element operating on the network device. The encrypted first portion may then be obtained from the one or more buffers responsive to receipt of the indication and the encrypted first portion may be decrypted using the first key.

According to some examples, implementation of this second method may include the first key having one of a block cipher key or a stream cipher key. The block cipher key may be based on one of 3DES or AES.

According to some examples, implementation of this second method may include the destination associated with the first processing element to include the destination also being associated with an application arranged to operate in cooperation with the first processing element. The instructions may also cause the system to have the first processing element obtain the encrypted first portion by performing a copy and decrypt operation that includes copying the encrypted first portion of data and decrypting the encrypted first portion before sending the decrypted first portion to a portion of the memory for the network device that is accessible to the application.

According to some examples, implementation of this second method may include the first processing element and the second processing element as respective first and second virtual machines implemented on one or more cores of a multi-core processor. The network device may include a virtual machine manager to establish a pool of buffers that includes the one or more buffers. The first and second virtual machines may have read-only access to the pool of buffers.

According to some examples, implementation of this second method may include the virtual machine manager sending an indication to the input/output device that the one or more buffers are available to at least temporarily store additionally received data having a destination associated with the first virtual machine or the second virtual machine. The indication may be sent responsive to the first virtual machine decrypting the first portion of data.

According to some examples, at least one machine readable medium comprising a plurality of instructions that in response to being executed on a computing device cause the computing device to carry out the example second method as mentioned above.

In some examples an apparatus or device may include means for performing the example second method as mentioned above.

According to some examples, an example apparatus or device maintained at an input/output device for a network device may include a processor circuit and a memory unit communicatively coupled to the processor circuit. The memory unit may be arranged to store instructions for logic operative on the processor circuit. The logic may be configured to exchange a first key with a first processing element operating on the network device. The logic may also be configured to encrypt at least a first portion of data received by the input/output device. The received data having a destination associated with the first processing element. The first portion of data may be encrypted using the first key. The logic may also be configured to cause the encrypted first portion to be sent to one or more buffers maintained at least in part in memory for the network device. The memory may be arranged to enable sharing of the one or more buffers with at least a second processing element operating on the network device.

In some examples for the example device, the memory unit may include volatile memory.

According to some examples for the example device, the first key may include one of a block cipher key or a stream cipher key. The block cipher key or the stream cipher key may be based on one of Triple Data Encryption Standard (3DES) or Advanced Encryption Standard (AES).

In some examples for the example device, the logic may also be configured to indicate to the first processing element that the encrypted first portion has been sent to the one or more buffers. The first processing element may be arranged to obtain the encrypted first portion from the one or more buffers responsive to the indication. The first processing element may also be arranged to decrypt the encrypted first portion using the first key. For these examples, the data received by the input/output device may be a data packet having a header and a payload. The first portion of the data received may include one of the payload or the header. Also, if the first portion includes the payload, the logic may cause the encrypted first portion to be sent to a first buffer from among the one or more buffers. A second portion of the data received may include the header. The logic may also be configured to separately encrypt the header using the first key and cause the encrypted header to be sent to a second buffer from among the one or more buffers.

According to some examples for the example device, the first processing element and the second processing element may be respective first and second virtual machines implemented on one or more cores of a multi-core processor. The network device may include a virtual machine manager to establish a pool of buffers that includes the one or more buffers. The first and second virtual machines may have read-only access to the pool of buffers. For these examples, the logic may also be configured to indicate to the first virtual machine that the encrypted first portion of data has been sent to the one or more buffers. The first virtual machine may be arranged to obtain the encrypted first portion from the one or more buffers responsive to the indication. The first virtual machine may also be arranged to decrypt the encrypted first portion using the first key. The logic may also be configured to receive an indication from the virtual machine manager that the one or more buffers are available to at least temporarily store additionally received data having a destination associated with the first virtual machine or the second virtual machine. The indication may be received responsive to the first virtual machine decrypting the first portion of data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
exchanging a key between an input/output device for a network device and a first processing element operating on the network device, the key including one of a block cipher key or a stream cipher key;
receiving a plurality of data packets, each of the plurality of data packets having a header and a payload at the input/output device, the plurality of data packets having a destination associated with the first processing element;
encrypting each of the payloads using the key;
encrypting each of the plurality of headers together as a group using the key;
sending the encrypted payloads to first shared buffers maintained at least in part in memory for the network device, the memory arranged to be shared with at least a second processing element operating on the network device;

sending the encrypted group of headers to a second buffer maintained at least in part in the memory and assigned to the second processing element, the network device to include a virtual machine manager to establish a pool of buffers that includes the first and second buffers and at least a first virtual machine that includes at least the first processing elements; and indicating to the first virtual machine that the encrypted payloads have been sent to the first buffer, the first virtual machine to:

obtain the encrypted payloads from the first shared buffers responsive to the indication; and decrypt the encrypted payloads using the key.

2. The method of claim 1, comprising the block cipher key or the stream cipher key to be based on one of Triple Data Encryption Standard (3DES) or Advanced Encryption Standard (AES).

3. The method of claim 1, comprising indicating to the first processing element that the encrypted payloads have been sent to the first shared buffers, the first processing element arranged to obtain the encrypted payloads from the first buffer responsive to the indication, the first processing element also arranged to decrypt the encrypted payloads using the key.

4. The method of claim 3, comprising the destination associated with the first processing element to include the destination also being associated with an application arranged to operate in cooperation with the first processing element, the first processing element to obtain the encrypted payload by performing a copy and decrypt operation that includes copying the encrypted payload and decrypting the encrypted payload before sending the decrypted payload to a portion of the memory for the network device that is accessible to the application.

5. The method of claim 1, comprising indicating to the first processing element that the encrypted payload has been sent to the first buffer and the header has been sent to the second buffer, responsive to the indication, the first processing element arranged to obtain the encrypted payload from the first buffer and obtain the header from the second buffer, the first processing element also arranged to decrypt the encrypted payload using the key.

6. The method of claim 1, comprising the first processing element and the second processing element as one of separate cores of a multi-core processor or separate virtual machines implemented on one or more cores of the multi-core processor.

7. The method of claim 6, comprising the first processing element included in the first virtual machine and the second processing element included in a second virtual machine.

8. The method of claim 7, comprising the virtual machine manager, responsive to the first virtual machine decrypting the payload, indicating to the input/out device that the first buffer is available to at least temporarily store additionally received data having a destination associated with the first virtual machine or the second virtual machine.

9. An apparatus maintained at an input/output device for a network device comprising:

a processor circuit; and a memory unit communicatively coupled to the processor circuit, the memory unit arranged to store instructions for logic operative on the processor circuit, the logic configured to exchange a key with a first processing element operating on the network device, the key including one of a block cipher key or a stream cipher key, the logic also configured to encrypt a payload of each of a plurality of data packets, each of the plurality of data packets also having a header, the plurality of data packets received by the input/output device, the received plurality of data packets having a destination associated with the first processing element, the payloads encrypted using the key, the logic also configured to encrypt each of the plurality of headers together as a group using the key, the logic also configured to cause the encrypted payloads to be sent to first shared buffers maintained at least in part in memory for the network device, the memory arranged to be shared with at least a second processing element operating on the network device and send the encrypted group of headers to a second buffer maintained at least in part in the memory and assigned to the second processing element, the network device to include a virtual machine manager to establish a pool of buffers that includes the first and second buffers and at least a first virtual machine that includes at least the first processing element, the logic also configured to indicate to the first virtual machine that the encrypted payloads have been sent to the first buffer, the first virtual machine to obtain the encrypted payloads from the first shared buffers responsive to the indication and to decrypt the encrypted payloads using the key.

10. The apparatus of claim 9, comprising the memory unit to include volatile memory.

11. The apparatus of claim 9, comprising the block cipher key or the stream cipher key to be based on one of Triple Data Encryption Standard (3DES) or Advanced Encryption Standard (AES).

12. The apparatus of claim 11, comprising the second processing element included in a second virtual machine implemented on one or more cores of a multi-core processor.

13. The apparatus of claim 12, comprising the logic also configured to receive an indication from the virtual machine manager that the first shared buffers are available to at least temporarily store additionally received data having a destination associated with the first virtual machine or the second virtual machine, the indication received responsive to the first virtual machine decrypting the payloads.

14. A method comprising:

exchanging a key between an input/output device for a network device and a first processing element operating on the network device, the key including one of a block cipher key or a stream cipher key;

receiving, at a first virtual machine, an indication that an encrypted payload of each of a plurality of data packets received by the input/output device and having a destination associated with the first processing element have been encrypted using the key, the indication also to include information to indicate that the encrypted payloads are stored in first shared buffers maintained at least in part in memory for the network device, the memory arranged to be shared with at least a second processing element operating on the network device, the information to also indicate that headers for the plurality of data packets is stored, as an encrypted group of headers, to a second buffer maintained at least in part in the memory and assigned to the second processing element, the first shared buffers and the second buffer included in a pool of buffers established by a virtual machine manager of the network device, at least the first processing elements included in the first virtual machine;

obtaining the encrypted payloads from the first shared buffers and the encrypted group of headers from the second buffer responsive to receipt of the indication; and decrypting the encrypted payloads using the key.

15. The method of claim 14, comprising the block cipher key to be based on one of Triple Data Encryption Standard (3DES) or Advanced Encryption Standard (AES).

16. The method of claim 14, comprising the destination associated with the first processing element to include the destination also being associated with an application arranged to operate in cooperation with the first processing element, the first processing element to obtain the encrypted payload by performing a copy and decrypt operation that includes copying the encrypted payloads and decrypting the encrypted payloads before sending the decrypted payloads to a portion of the memory for the network device that is accessible to the application.

17. The method of claim 14, comprising the second processing element included in a second virtual machine implemented on one or more cores of a multi-core processor.

18. The method of claim 17, comprising the virtual machine manager to send an indication to the input/output device that the first buffer is available to at least temporarily store additionally received data having a destination associated with the first virtual machine or the second virtual machine, the indication to be sent responsive to the first virtual machine decrypting the payload.

* * * * *

UNITED STATES PATENT AND TRADEMARK OFFICE
CERTIFICATE OF CORRECTION

PATENT NO. : 9,973,335 B2
APPLICATION NO. : 13/839080
DATED : May 15, 2018
INVENTOR(S) : Ben-Zion Friedman et al.

Page 1 of 1

It is certified that error appears in the above-identified patent and that said Letters Patent is hereby corrected as shown below:

In the Specification

Column 2, Line 51, replace "100" with -- I/O --.

Column 4, Line 15, replace "L/O" with -- I/O --.

Column 5, Line 26, replace "11" with -- 111 --.

Column 6, Line 24, replace "1" with -- 111 --.

Signed and Sealed this
Twenty-eighth Day of May, 2019

Andrei Iancu
*Director of the United States Patent and Trademark Office*